United States Patent Office 3,155,666
Patented Nov. 3, 1964

3,155,666
1-DIALKYLAMINOALKYL - 5-DIPHENYLMETHYL-1H-TETRAZOLES AND RELATED COMPOUNDS
John W. Cusic, Skokie, Ill., assignor to G. D. Searle & Co., Chicago, Ill., a corporation of Delaware
No Drawing. Filed July 18, 1963, Ser. No. 296,089
5 Claims. (Cl. 260—268)

The present invention relates to a group of tetrazoles having a dialkylaminoalkyl substituent. More particularly it relates to a group of compounds which can be represented by the following general formula

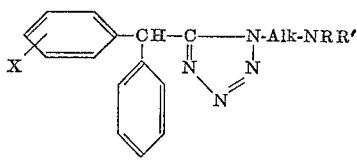

wherein X is selected from the group consisting of hydrogen and halogen; Alk is a lower alkylene radical; and —NRR' is selected from the group consisting of —N(lower alkyl)$_2$, 1-pyrrolidinyl, piperidino, and 4-methyl-1-piperazinyl.

The lower alkyl radicals referred to above contain up to six carbon atoms and can be exemplified by radicals such as methyl, ethyl, propyl, isopropyl, butyl, and hexyl. The lower alkylene radicals referred to above likewise contain up to six carbon atoms and, preferably, they separate the nitrogens attached thereto by at least two carbon atoms. Such radicals can be either straight or branch-chained and they are exemplified by radicals such as ethylene, trimethylene, 2-methyl-trimethylene, tetramethylene, and the like. The halogens referred to above can be fluorine, chlorine, bromine, or iodine.

The organic bases of this invention form pharmaceutically acceptable salts with a variety of inorganic and strong organic acids including sulfuric, phosphoric, hydrochloric, hydrobromic, sulfamic, citric, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, benzyl chloride and bromide, dimethyl sulfate, methyl benzenesulfonate, and ethylene chlorohydrin.

The compounds of the present invention are conveniently prepared from the appropriately substituted diphenylacetonitrile. This is heated with sodium azide and ammonium chloride to give, for example, 5-diphenylmethyl-1H-tetrazole having the following formula

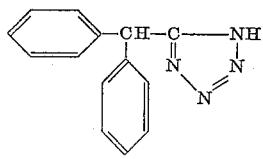

when diphenylacetonitrile is used as the starting material. The tetrazole is then reacted with an appropriate dialkylaminoalkyl halide or related compound in the presence of base to give the desired tetrazoles of the present invention.

The compounds of this invention possess valuable pharmacological properties. In particular, they are anti-ulcer agents as is demonstrated by their inhibition of ulceration in the Shay rat. They are also inhibitors of hepatic cholesterol synthesis. In addition, they are anti-bacterial and anti-algal agents as is demonstrated by their inhibition of the growth of the organisms *Diplococcus pneumoniae* and *Chlorella vulgaris*, and they inhibit germination of seeds of trifolium.

The following examples are presented to further illustrate the present invention; they should not be construed as limiting it in spirit or in scope. Quantities are indicated in parts by weight and temperatures in degrees centigrade (° C.).

EXAMPLE 1

A mixture of 193 parts of diphenylacetonitrile, 35 parts of sodium azide, 5 parts of ammonium chloride and 240 parts of dimethylformamide is heated and stirred at about 120° C. for 24 hours. The reaction mixture is then filtered and the filtrate is concentrated under reduced pressure to about ¼ the original volume. The mixture is then poured into 100 parts of water and excess acetic acid is added. An oil forms but this solidifies on standing. The solid material is separated and then crystallized from ethanol to give 5-diphenylmethyl-1H-tetrazole melting at about 147–149° C.

If an equivalent quantity of the appropriate substituted diphenylacetonitrile is substituted for the diphenylacetonitrile in the above procedure, the following compounds are obtained: 5-(4-fluoro-α-phenylbenzyl-1H-tetrazole, 5-(3 - chloro-α-phenylbenzyl)-1H-tetrazole, 5-(4-chloro-α-phenylbenzyl)-1H-tetrazole melting at about 186–188° C., and 5-(4-bromo-α-phenylbenzyl)-1H-tetrazole.

EXAMPLE 2

A mixture of 11.8 parts of 5-diphenylmethyl-1H-tetrazole, 10 parts of diethylaminoethyl chloride, and 4 parts of sodium methoxide in 160 parts of 2-propanol is stirred and refluxed for 6 hours. The resultant mixture is filtered and the solvent is evaporated from the filtrate under reduced pressure. Acetone is added to dissolve the residue and the resultant solution is filtered to remove a small amount of precipitate. A solution of excess hydrogen chloride in ethanol is added to the acetone solution and an oil forms. The oil solidifies on standing and the resultant solid is separated and recrystallized from 2-propanol to give 1 - (2-diethylaminoethyl) - 5 - diphenylmethyl-1H-tetrazole hydrochloride melting at about 161–163° C. The free base of this compound has the following formula

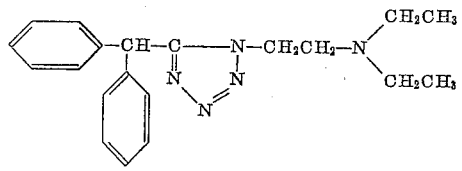

EXAMPLE 3

An equivalent quantity of 2-dimethylaminoethyl chloride is substituted for the 2-diethylaminoethyl chloride and the procedure of Example 2 is repeated. The crude product is isolated in the indicated manner and then reacted with hydrogen chloride as indicated. The resultant salt is separated and recrystallized from 2-propanol to give 1-(2-dimethylaminoethyl)-5-diphenylmethyl-1H-tetrazole hydrochloride melting at about 184–185° C.

EXAMPLE 4

11.8 parts of 5-diphenylmethyl-1H-tetrazole is reacted with 10 parts of 3-dimethylamino-2-methylpropyl chloride according to the procedure described in Example 2. The crude tetrazole is dissolved in alcohol and an ethanolic solution of excess oxalic acid is added. The solid which precipitates is separated. It is 1-(3-dimethylamino-2-methylpropyl) - 5 - diphenylmethyl-1H-tetrazole oxalate melting at about 143–144° C. The free base of this compound has the following formula

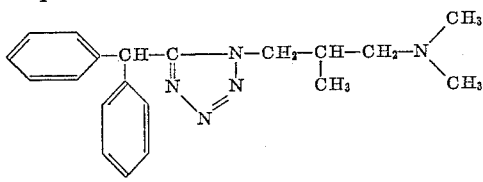

EXAMPLE 5

If 12 parts of 2-diisopropylaminoethyl chloride is substituted for the 2-diethylaminoethyl chloride and the procedure of Example 2 is repeated, the product first isolated is 1-(2-diisopropylaminoethyl) - 5 - diphenylmethyl-1H-tetrazole which melts at about 89–90° C. This product is then dissolved in ethanol and reacted with an excess of maleic acid in ethanol. The solid which precipitates is separated from the mixture and recrystallized from 2-butanone to give 1 - (2-diisopropylaminoethyl) - 5 - diphenylmethyl-1H-tetrazole maleate melting at about 145–146° C.

EXAMPLE 6

A mixture of 13.5 parts of 5-(4-chloro-α-phenylbenzyl)tetrazole, 12 parts of 2-diisopropylaminoethyl chloride, 4 parts of sodium methoxide and 160 parts of 2-propanol is refluxed for six hours. The reaction mixture is then filtered and the solvent is evaporated from the filtrate to leave a residue which is then crystallized from a mixture of ethyl acetate and hexane. The product thus obtained is 1-(4-chloro-α-phenylbenzyl)-1-(2-diisopropylaminoethyl)-1H-tetrazole melting at about 133–139° C.

If an equivalent quantity of the appropriate halogen-substituted 5-diphenylmethyl-1H-tetrazole is used in place of the 5-(4-chloro-α-phenylbenzyl)-1H-tetrazole and the above procedure is repeated, the following compounds are obtained: 1-(2-diisopropylaminoethyl)-5-(4-fluoro-α-phenylbenzyl) - 1H - tetrazole, 1 - (2 - diisopropylaminoethyl) - 5 - (3 - chloro - α - phenylbenzyl) - 1H - tetrazole, and 1 - (2 - diisopropylaminoethyl) - 5 - (4 - bromo - α-phenylbenzyl)-1H-tetrazole.

EXAMPLE 7

If equivalent quantities of 1-(2-chloroethyl)-pyrrolidine, 1-(3-chloropropyl)piperidine, and 1-(2-chloroethyl)-4-methylpiperazine are substituted for the 2-diethylaminoethyl chloride and the procedure of Example 2 is repeated the products obtained are, respectively, 1-[2-(1-pyrrolidinyl)ethyl] - 5 - diphenylmethyl - 1H-tetrazole, 1-(3-piperidinopropyl)-5-diphenylmethyl-1H-tetrazole, and 1-[2 - (4 - methyl - 1-piperazinyl)-ethyl]-5-diphenylmethyl-1H-tetrazole.

The 1 - [2-(4-methyl-1-piperazinyl)ethyl]-5-diphenylmethyl-1H-tetrazole is dissolved in ethanol and treated with an excess of oxalic acid in ethanol. The solid which precipitates is separated and recrystallized from dilute ethanol to give the dioxalate salt of 1-[2-(4-methyl-1-piperazinyl)ethyl]-5-diphenylmethyl-1H-tetrazole melting at about 209–210° C. The free base of this compound has the following formula

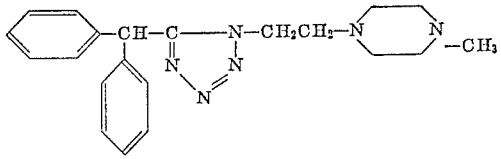

What is claimed is:
1. A compound of the formula

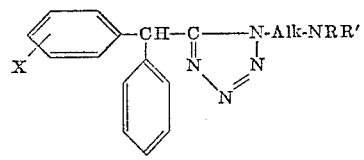

wherein X is selected from the group consisting of hydrogen and halogen; Alk is lower alkylene separating the nitrogens attached thereto by at least two carbon atoms; and —NRR' is selected from the group consisting of —N(lower alkyl)$_2$, 1-pyrrolidinyl, piperidino, and 4-methyl-1-piperazinyl.

2. A compound of the formula

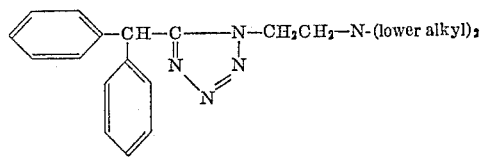

3. 1 - (2-diisopropylaminoethyl)-5-diphenylmethyl-1H-tetrazole.
4. 1 - (2 - diethylaminoethyl) - 5 - diphenylmethyl-1H-tetrazole.
5. 1 - [2 - (4 - methyl-1-piperazinyl)ethyl]-5-diphenylmethyl-1H-tetrazole.

References Cited in the file of this patent
UNITED STATES PATENTS

| | | |
|---|---|---|
| 2,470,085 | Harvill et al. | May 17, 1949 |
| 2,848,447 | Kracker et al. | Aug. 19, 1958 |
| 2,852,515 | Elpern | Sept. 16, 1958 |

OTHER REFERENCES

Gross et al.: Journal Pharm. and Exp. Therap., vol. 88, pp. 353–358 (1946).